3,338,379
CONVEYOR
Roy I. Patterson, 6700 W. Broadway,
Minneapolis, Minn. 55427
Filed Oct. 22, 1965, Ser. No. 500,943
4 Claims. (Cl. 198—151)

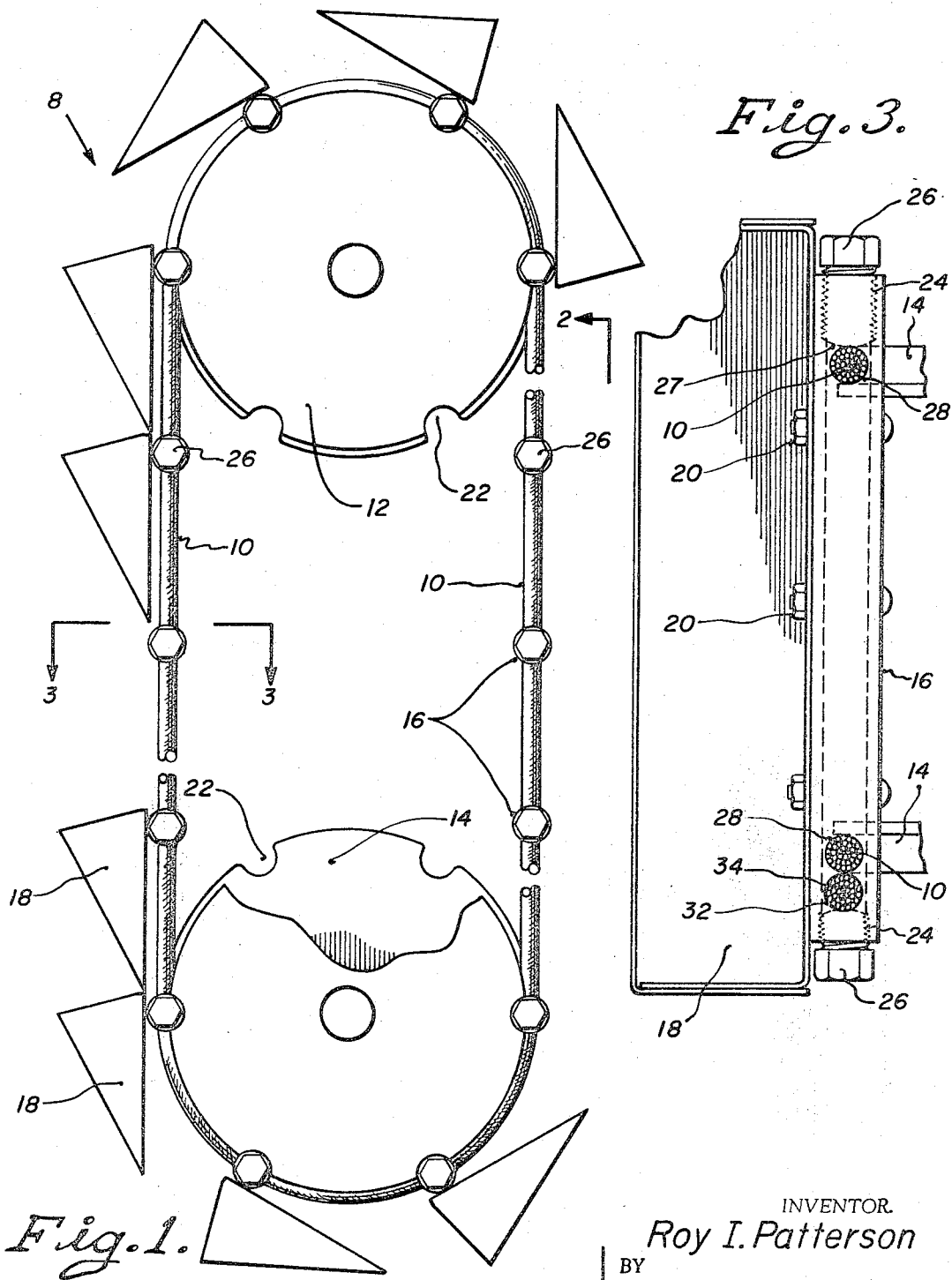

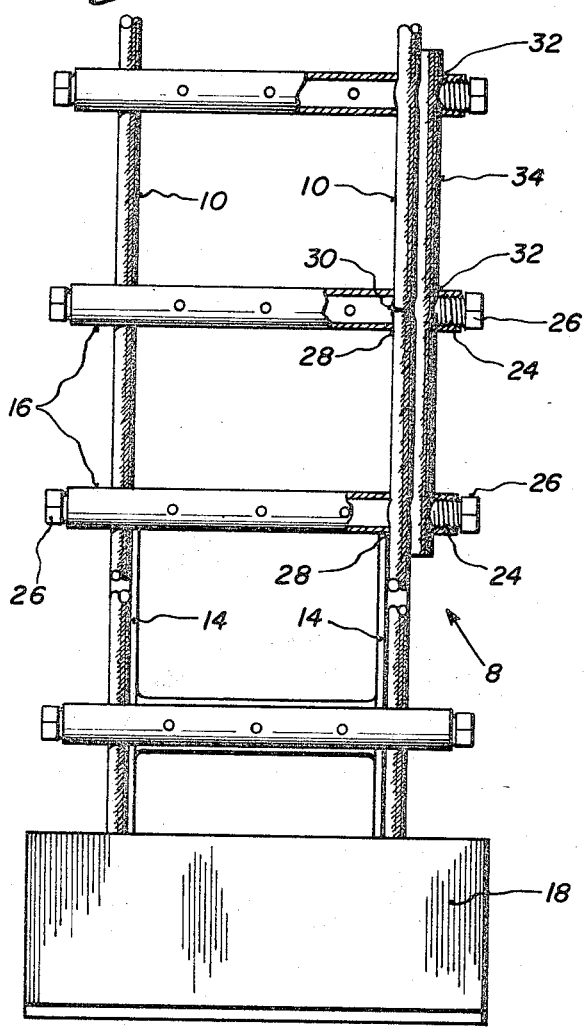

This invention relates to conveyors and more particularly to a new and improved endless cable conveyor for grain and the like.

The endless cable type of conveyor is well known in the art, but an inherent problem with such conveyors arises out of the necessity of connecting the opposite ends of a length of cable to provide a continuous cable adapted to smoothly traverse a pair of pulleys. The opposite ends of the cable may be clamped or spliced together, but in either case the resulting connection is an enlargement or lump in the cable which hinders passage over the pulley and causes deterioration of the pulley as it periodically passes into contact with a portion thereof. Moreover, such a connection may be weakened through repeated operation to the point of breaking.

Another problem encountered in the use of conventional cable type conveyors involves the connection of the conveyor cups or blades to the cable or cables. The connection to the cable must be quite secure to prevent any slipping of the conveyor cup or blade on the cable, and moreover the connection must not interfere with the smooth passage of the cable over the pulleys. It is also desirable to provide a positive drive for the conveyor cable to eliminate slippage of the cable on the pulley.

It is an object of the present invention to provide a novel means for securely affixing a conveyor cup or blade to a driven cable without interfering with the even passage of said cable over a pair of pulleys.

Another object of this invention is to provide a means for connecting the opposite ends of a cable so that the cable is continuous and yet able to pass evenly over a pulley.

Another object of the invention is to provide a connection between the ends of a cable which does not result in a weak portion in said cable, and which is capable of withstanding repeated operation without resulting deterioration in said connection or in the pulleys which it traverses.

Another object of the invention is to provide a positive drive conveyor wherein slippage of the cable over the drive pulley is eliminated.

Other objects and advantages of the invention will become apparent upon consideration of the following specification in conjunction with the accompanying drawings wherein:

FIG. 1 is a side elevation of a conveyor embodying the present invention.

FIG. 2 is a view taken along line 2—2 in FIG. 1.

FIG. 3 is a plan view of a portion of the apparatus illustrated in FIG. 2.

Referring to FIGS. 1 and 2, general reference numeral 8 indicates a portion of a double cable vertical conveyor in which a pair of parallel cables 10 are extended over a pair of drive pulleys 12, driven by means not shown, and a pair of idler or take up pulleys 14. A multiplicity of tubular members 16 are spacially affixed between the cables 10, each carrying a conveyor container or cup 18 secured to the tubular member 16 by bolts 20, as shown in FIG. 3.

A multiplicity of semicircular notches 22 are spacially disposed in the periphery of the pairs of pulleys 12 and 14, and are adapted to sequentially engage the tubular members 16 as the cables 10 pass over the pulleys 12 and 14.

As shown in FIGS. 2 and 3, each of the open ends of the tubular members 16 is provided with an interiorly threaded portion 24 adapted to receive a threaded bolt 26 having a conventional rounded end 27. Each of the tubular members 16 is formed with a transverse circular passage 28 adjacent each threaded end. The passages 28 are of a diameter substantially equal to the diameter of the cables 10, and each of the pair of cables 10 is passed through one of the passages 28 in each of the tubular members 16. The multiplicity of tubular members 16 carrying the conveyor cups 18 are spacially arranged on the pair of parallel pulleys 10 whereby the distance between each adjacent pair of tubular members 16 is substantially equal to the depth of the cups 18, as shown in FIG. 1, and is equal to the peripheral distance between adjacent notches 28 on the pulleys 12 and 14.

Referring now to the upper portion of FIG. 3, the bolt 26 is turned into the threaded portion 24 of the open end of the tubular member 16, wherein the rounded end 27 contacts the cable 10 extending transversely through the passage 28 in the tubular member 16, thereby tightly wedging the cable 10 into the passage 28 and creating a bulge within the tubular member 16 which prohibits movement of the tubular member 16 in either direction along the cable 10, thereby securely locking the tubular member 16 into position on the cable 10. The bulge produced in the cable by the rounded end 27 of the threaded bolt 26 is only a slight curvature of the cable, and moreover it is contained entirely within the tubular member 16 so as to in no way interfere with the even passage of the cable over the pulleys 12 and 14. Both ends of each of the tubular members 16 are secured to the pair of parallel cables 10 in the above described manner, except in the case of the tubular member 16 in which the opposite ends of one of the cables come together, as indicated at 30 in FIG. 2, and the adjacent tubular members on opposite sides thereof. These three tubular members 16 are formed with a passage 32 parallel to and in lateral communication with the passage 28, as shown in FIG. 2 and in the lower portion of FIG. 3. An auxiliary cable 34 extends through each of the passages 32 in parallel abutting relationship to the cable 10, and the bolt 26 is turned into the threaded open end 24 of each of these tubular members 16 thereby forcing the auxiliary cable 34 against the cable 10 and creating a slight bulge of cables 10 and 34 within each of the three tubular members 16, which prohibits movement of cable 34 and cable 10 within the passages 32 and 28 respectively, thereby locking the three above-named tubular members 16 to both the cable 10 and to the auxiliary cable 34 to secure the opposite ends of cable 10 in abutting relationship within the intermediate tubular member 16. As shown in the lower portion of FIG. 3, the cable 10 extends over the pulley 14 and the parallel cable 34 is disposed outside the pulley groove to permit free and even passage of cable 10 over the pulleys 12 and 14. The auxiliary cable 34 may extend through additional tubular members 16, but should extend through at least the three members herein described.

The invention herein described thus provides several advantages. Means are provided for securely affixing a multiplicity of conveyor cups or blades to the cable of a cable type conveyor, while at the same time providing means for the positive driving of the cable by a pulley and the elimination of slippage between said cable and pulley.

The invention further provides means for joining the opposite ends of a length of cable without producing an enlargement therein, whereby the cable is adapted to smoothly and evenly traverse a pair of pulleys. The described means for joining the ends of a cable in a conveyor assembly provides a connection of considerable strength which will not interfere with the passage of the cable over a pulley and which will not result in wearing or deterioration of the pulley by repeated contact between the connection and the pulley as the cable traverses the pulley.

It will be apparent to those skilled in the art that the apparatus herein described and illustrated in the appended drawings may be modified in numerous ways to achieve a similar apparatus embodying the principles of the present invention, and therefore it is intended that the invention be limited only by the appended claims.

I claim:

1. In a conveyor assembly, a flexible cable, means for joining the opposite ends of said cable comprising at least three spacially disposed tubular members each formed with a threaded open end and a pair of transverse laterally communicating passages, said cable extending through one of said passages in two of said members, the opposite ends of said cable positioned in abutting relationship within a passage of the third of said tubular members, a flexible auxiliary cable passing through the other of said passages in all of said members and in parallel abutting relationship to said first named cable and including the abutted ends thereof, and a threaded member extending into the open end of each of said tubular members engaging said auxiliary cable and wedging the same against said first named cable and wedging both of said cables against the passages in said tubular member.

2. A conveyor, comprising flexible cables, a tubular member formed with at least one threaded open end and two laterally communicating passages extending transversely through said tubular member adjacent said one open end, the opposite ends of one of said cables positioned in abutting relationship within one of the passages in said tubular member, an auxiliary flexible cable extending through the other passage in said tubular member adjacent the junction of the abutting ends of said one cable, a threaded member extending into the said open end of said tubular member and engaging the thread within said tubular member and wedging said auxiliary cable against said one cable and wedging both of said cables against the passages in said tubular member, and a rotatable pulley traversed by said cables, said pulley formed with a multiplicity of spacially disposed peripheral notches, one of which is adapted to engage said tubular member and form a connection between said pulley and said cables.

3. An assembly as claimed in claim 2, together with a material moving member affixed to said tubular member.

4. In a conveyor assembly, a flexible cable, a tubular member formed with at least one threaded open end and two laterally communicating passages extending transversely through said tubular member adjacent said open end, the opposite ends of said cable positioned in abutting relationship within one of the passages in said tubular member, an auxiliary flexible cable extending through the other passage in said tubular member adjacent the junction of the abutting ends of said first named cable, and a threaded member extending into said open end of said tubular member and engaging the thread within said tubular member and wedging the said auxiliary cable against the first named cable and wedging both of said cables against the passages in said tubular member.

References Cited

UNITED STATES PATENTS

| | | | |
|---|---|---|---|
| 899,854 | 9/1908 | Younkman | 198—51 |

FOREIGN PATENTS

| | | |
|---|---|---|
| 319,086 | 2/1920 | Germany. |
| 595,579 | 4/1934 | Germany. |
| 17,842 | 8/1903 | Great Britain. |

EVON C. BLUNK, *Primary Examiner.*

RICHARD E. AEGERTER, *Examiner.*